Dec. 4, 1934.                 H. L. WILLIAMS                    1,983,113
                              LOADING EQUIPMENT
                        Filed June 26, 1931          2 Sheets-Sheet 1
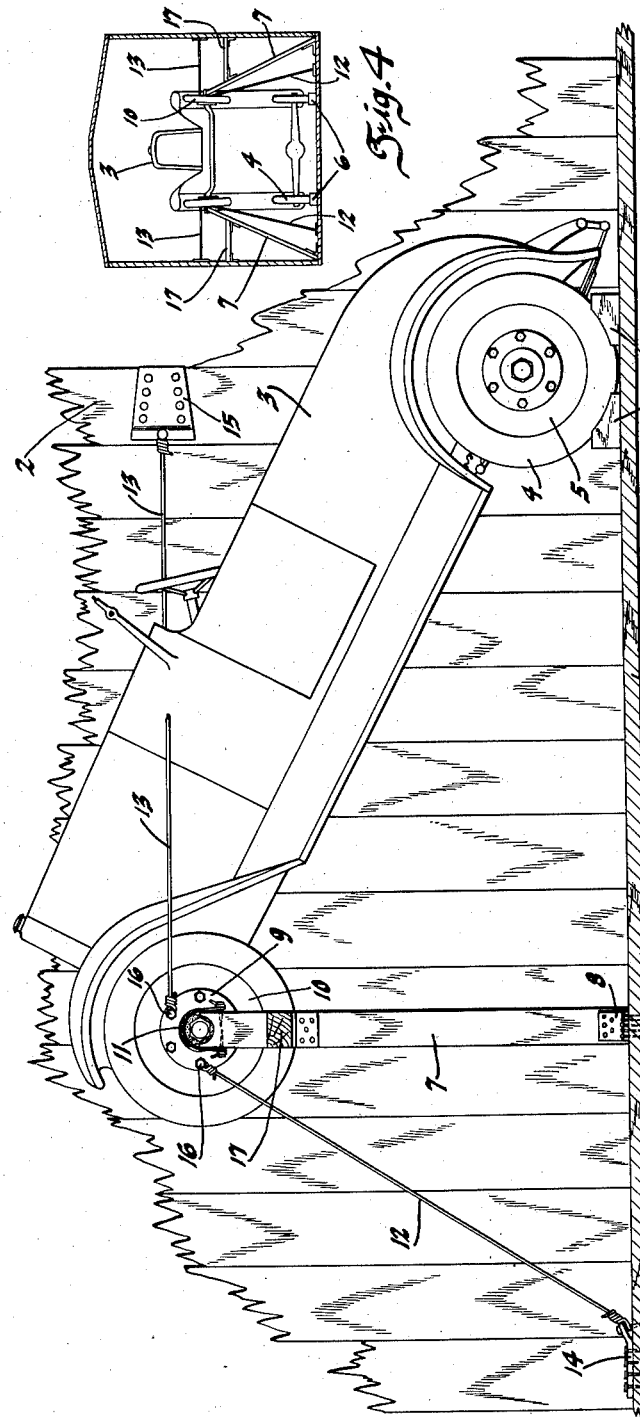
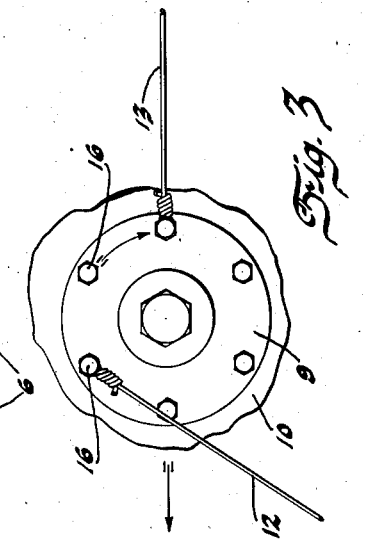
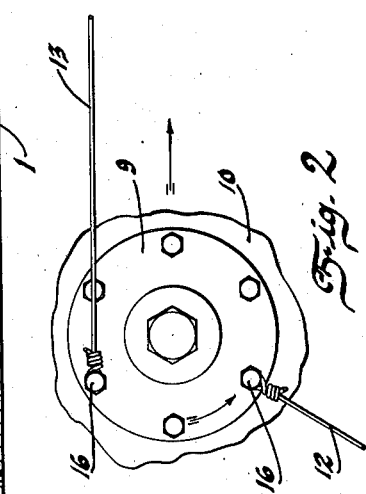
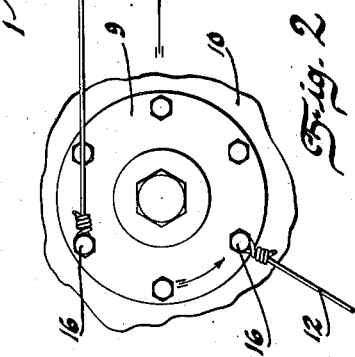
Inventor
Hubert L. Williams
By Blackmore, Spencer n'Hieh-
Attorneys

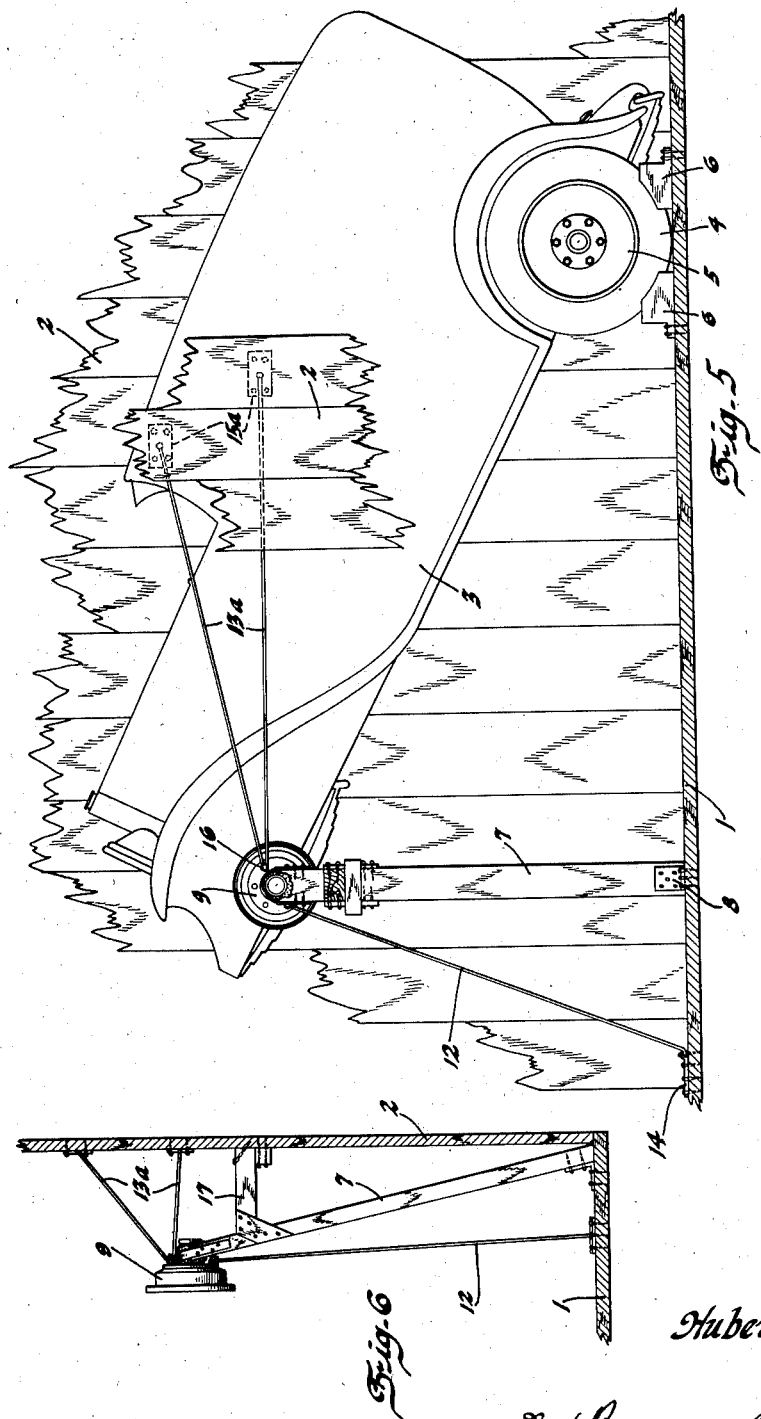

Patented Dec. 4, 1934

1,983,113

UNITED STATES PATENT OFFICE 1,983,113

LOADING EQUIPMENT

Hubert L. Williams, Detroit, Mich., assignor to General Motors Corporation, Detroit, Mich., a corporation of Delaware Application June 26, 1931, Serial No. 547,041

9 Claims. (Cl. 105—368)

This invention relates to the transportation of freight and particularly to the anchoring of large and bulky objects for shipment in railroad cars, boats or carrier conveyances. It is especially suited for loading motor vehicles in freight cars, although its field of application is not so limited.

Injury and damage to shipments sometimes occur as a result of the severe jolting and shocks to which freight cars are subjected in transit. In the case of automobile shipments, moorings are frequently strained and broken and the vehicles then bump against each other and against the walls of the freight car. I have found that there is less likelihood of the loaded vehicle becoming jerked loose if its mounting is such that the vehicle can float or have a certain limited freedom of movement and if the suddenness of strain imposition on attachment parts is avoided, and I have devised equipment which will cushion thrusts by a gradual checking of the momentum or bodily movement of the loaded vehicle relative to the carrier as tends to occur on sudden starts and stops.

For a better understanding of the nature of the invention, reference may be had to the accompanying drawings, wherein Figure 1 is a side elevation showing an automobile loaded in a freight car with the various parts in normal position; Figures 2 and 3 are detail views illustrating positions certain parts assume in the cushioning of thrusts; Figure 4 is a transverse view through a loaded box car on a small scale; Figure 5 is a view similar to Figure 1 illustrating a slight modification; Figure 6 is a transverse section through a portion of a box car showing an end view of the loading structure and Figure 7 is a detail sectional view of an attachment element on the automobile wheel.

Referring to the drawings the numeral 1 indicates the floor and 2 the side wall of a freight car or other carrier, in which is loaded the automobile 3. The automobile is shown in inclined position with one end resting directly on the floor through the resilient tire 4 on the rear wheel 5. This wheel is preferably chocked by front and rear blocks 6. The front end of the motor car is supported in an elevated position as by means of vertical posts 7, one at each side, the lower ends of which may be secured to the floor as by nailing plates 8, while the upper ends are shown each with a notch to receive an adjacent hub 9 of a front wheel 10. A retainer strap 11 may be positioned over the top of the hub and secured to the upper end of the post 7 to hold the hub in the notch of the post.

These two supporting posts preferably converge or extend diagonally upward from the floor 1, being secured at their lower ends to the floor adjacent the side walls 2 as is illustrated particularly in Figure 4, so as to afford ample clearance or space for positioning or loading on the floor between the posts and under the elevated automobile, a portion of a second automobile. For the lateral bracing of each inclined post there may be provided a brace member 17 extending between the upper portion of the supporting post and the side wall 2 of the freight car.

Also associated with each supporting post 7, and extending in opposite directions therefrom, are a pair of braces or guys 12 and 13, one end of the guy 12 being shown secured to the floor 1 by means of an anchor plate 14 and one end of the guy 13 being secured to the side wall 2 through a suitable anchor plate 15. If desired the guy 13 could be anchored to the floor but it is found to be more convenient to fasten it to the side wall as shown. The other end of each guy wire is shown connected to certain of the fastening bolts 16 by which the wheel 10 is secured to the hub 9. It will be understood that if the automobile to be shipped is equipped with detachable rims connection could be made with the rim bolts. Instead of using the elevated wheel of the vehicle it will be obvious that a rotatable part may be pivoted directly to and form a part of the post 7. In any event the guys are so connected to the rotatable part that in the normal position of the parts, as illustrated in Figure 1, the guys extend in a direction substantially tangential to the arc of movement of the attachment points of the rotatable member.

With this arrangement the automobile is permitted a limited amount of movement in the car, both because of the resiliency of the pneumatic tire 4 and the free pivotal movement of the wheel 10, through which the bracing is effected. Assuming the forced movement of the automobile is toward the right in Figure 1, the post 7 will rock or tilt about its connection with the floor, toward the right, and the wheel 10 through its connection with the guy 12 will be rotated in a counter-clockwise direction toward the position illustrated in Figure 2, where the guy, instead of extending in a tangential direction, is in radial alinement with the axis of rotation. If on the other hand, the movement of the automobile is toward the left, the guy 13 causes a clockwise rotation of the wheel which takes up slack in the wire 12 and brings the guy 13 into radial alinement with the wheel axis, as illustrated in Figure 3. In either event the effective length of the guy taking the stress, is increased by the rotation of the wheel, and the mechanical advantage afforded by the rotating part decreases at a rate that is inversely proportional to the extent of forced movement. Thus the resistance offered by the guys increases gradually and the strain imposed is distributed over a longer period so that the likelihood of the guy snapping or breaking loose from its points of attachment is materially reduced and the movement is cushioned and checked, the freedom of movement decreasing as the wheel is rotated, until the guy comes into radial alinement with the axis of rotation when further movement is rigidly resisted.

It may be mentioned incidentally that since these stresses are taken on the wires it is possible to use a very small nailing plate 8 with only a few nails.

In the arrangement shown in Figure 5 the parts are the same as those heretofore described except that one of the guy wires 13a is doubled back and fastened as by suitable anchor plates 15a or otherwise at both ends to the car wall 2, with the bight passing around the wheel attachment stud 16, the wheel being removed.

The principal purpose of the looped guy is to afford an increased factor of safety by distributing the strains to two boards on the wall instead of only one as in the case with the parts guyed in the fashion illustrated by Figure 1. The same thought can be extended to the other guy if it is so desired.

As shown in Figure 7 the studs 16 to which connection of the guy wires is made are preferably surrounded by a sleeve 18 which is threaded upon the stud and locked or jammed in place by the usual wheel nut 19. Because the nut is of larger diameter than the sleeve it forms with the hub flange an annular groove to receive the bight or bend of the guy wire and retain the wire in place. The jamming effect of the nut prevents it from turning and working off the stud as the parts move incident to the snubbing action previously referred to.

A further function of the sleeve is to add strength and distribute the stresses over a larger portion of the stud and also to protect the screw threads from mutilation. A certain amount of friction is present between the bearing surfaces of the sleeve and return bend of the wire as the wheel hub rotates between its extreme positions shown in Figures 2 and 3.

I claim:

1. In the loading of vehicles for shipment by carrier, means to float the gravity weight of the vehicle to allow movement of the vehicle under its own momentum, means to check vehicle movement including a member oscillatably mounted on the vehicle, a substantially inextensible guy, an anchorage to fasten one end of the guy to the carrier and a connection between the other end of the guy and the oscillatory member at a point out of alinement with the anchored end and the axis of said member, whereby said member is rocked by the pull of the guy upon movement of the axis away from the anchored end to bring said connection toward alined relation.

2. In combination with a carrier and a vehicle to be loaded for shipment in the carrier, of means on the floor of the carrier to block the tires mounted on the wheels at one end of the vehicle, other means associated with the carrier to support in elevated position and accommodate movement of the opposite end of the vehicle, and a guying element anchored at one end to the carrier and connected at its other end to an elevated vehicle wheel at a point out of line with the wheel axis and the anchored end of the guying element, said wheel being free to rotate upon movement of the vehicle on said supporting means in a direction away from the anchored end of the guying element so as to bring the guying element toward a plane that extends radially from the wheel axis.

3. Loading equipment in which an article to be shipped is so loaded in a carrier that it can shift back and forth under its own momentum, means to snub such movement, including a rocking member associated with the article for movement therewith, and a pair of guys normally extending tangentially from said member in different directions with their remote ends fixed relative to the carrier so as to cause the member to rock upon a movement of the article relative to the carrier and bring the plane of one or the other of said guys toward radial alinement with the rocking axis.

4. Loading equipment in which an article to be shipped is so loaded in a carrier that it can shift under its own momentum, means to snub such movement, including a variable leverage tensionable guying connections between the article and carrier in which the mechanical advantage decreases with the extent of relative movement.

5. The combination with a carrier and an article to be shipped, of means associated with the carrier to float the weight of the article, and other means to cushion relative movements between the article and carrier, including an oscillatory element associated with the article, a pair of substantially inextensible guys extending in opposite directions from said element and having their remote ends anchored to the carrier and connections between said element and the respective guys at their adjacent ends, each connection located normally out of line with the axis of oscillation of said element and the remote end anchorage but adapted to be brought toward alinement by the oscillation of said element upon movement of the axis in a direction away from the anchored end of the guy.

6. In combination with a carrier and a vehicle to be shipped on the carrier, of means to mount one end of the vehicle on the floor of the carrier, a supporting post extending upwardly from the floor on each side of the vehicle to engage and hold the other end of the vehicle in elevated position above the floor, a rotatable element associated with a post, a substantially inextensible tie member connected at one end to the carrier and at the other end to said rotatable element, the connection between the element and member being normally out of line with the axis of rotation of said member and the connection between the element and carrier, whereby a movement of the rotational axis away from the last mentioned connection results in a rotary movement of the element bringing the connection between the element and member toward alinement with the rotational axis and the connection between the element and carrier.

7. In the art of transporting motor vehicles by carrier, the method of loading a vehicle for floating movement under its own momentum and for absorbing the shock of forced movement, which includes chocking the tires at one end of the vehicle, elevating the opposite end of the vehicle above the floor, and supporting the same by a pair of posts extending upwardly from the floor in a manner to allow the free rotation of the elevated vehicle wheels, and connecting opposite ends of a pair of substantially inextensible guys to a wheel and the carrier, with the guys extending on opposite sides of the wheel in directions non-radial to the axis of wheel rotation, the arrangement and operation of the parts being such that upon forced movement said axis tensions one of the guys and causes a wheel rotation which shifts the guy toward radial alinement with said axis and thus affords a changing mechanical advantage giving increasing resistance to movement as the movement increases.

8. In the art of loading a motor vehicle in a carrier for transportation, means to support an end of the vehicle out of contact with the carrier for movement under its own momentum and means to cushion and retard the movement including a substantially inextensible guy anchored at one end to the carrier and fastened at its opposite end to a freely rotatable vehicle wheel at a point out of line with the wheel axis and the anchored end of the guy to afford thereby a toggle link snubbing action.

9. Means to cushion inertia forces of an article during transit in a carrier, including a member adapted to be mounted for oscillation on the article, means mounting said article in the carrier with said member out of engagement with the carrier and a substantially inextensible guy having an end anchored to the carrier and engaging the member at a point out of alinement with its anchored end and the axis of oscillation whereby the out of alinement relation decreases upon movement of the article in a direction away from the anchored end of the guy.

HUBERT L. WILLIAMS.